United States Patent
Prakash et al.

(10) Patent No.: US 9,266,642 B2
(45) Date of Patent: Feb. 23, 2016

(54) STEEL WRAPPED PRESSURE VESSEL

(71) Applicant: Wiretough Cylinders LLC, Bristol, VA (US)

(72) Inventors: Amit Prakash, Hudson, OH (US); George Richard Sharp, Marco Island, FL (US); Brian Townsend Deeken, Doylestown, OH (US); William James Head, Ravenna, OH (US); William H Thomson, Akron, OH (US)

(73) Assignee: WireTough Cylinders, LLC, Bristol, VA (US)

( * ) Notice: Subject to any disclaimer, the term of this patent is extended or adjusted under 35 U.S.C. 154(b) by 0 days.

(21) Appl. No.: 13/686,331

(22) Filed: Nov. 27, 2012

(65) Prior Publication Data

US 2013/0082066 A1    Apr. 4, 2013

Related U.S. Application Data

(63) Continuation-in-part of application No. 12/235,856, filed on Sep. 23, 2008.

(51) Int. Cl.
*F17C 1/06* (2006.01)
*F17C 1/02* (2006.01)
(Continued)

(52) U.S. Cl.
CPC ............. *B65D 13/00* (2013.01); *B21C 19/00* (2013.01); *F17C 1/06* (2013.01); *F17C 2201/0109* (2013.01); *F17C 2201/035* (2013.01); *F17C 2201/054* (2013.01); *F17C 2201/056* (2013.01); *F17C 2201/058* (2013.01); *F17C 2203/012* (2013.01); *F17C 2203/0604* (2013.01);

(Continued)

(58) Field of Classification Search
CPC ............. B21D 51/24; F17C 2201/056; F17C 2223/0123; F17C 2209/2163; F17C 2260/011; F17C 2260/012; F17C 2209/2154; F17C 2205/0305; F17C 2223/036; F17C 2203/0604; F17C 2201/0109; F17C 1/16; B23K 31/02; B23K 2201/12; B65D 88/10; B65D 88/12
USPC ..................... 220/588–592, 646; 228/184
See application file for complete search history.

(56) References Cited

U.S. PATENT DOCUMENTS 1,281,557 A    10/1918  Goodall
2,335,038 A *  11/1943  Bridges .................. 220/646
(Continued)

OTHER PUBLICATIONS

Raymond, Louis, Second National Symposium on Test Methods for Hydrogen Embrittlement: Prevention and Control; sponsored by ASTM Subcommittee F7.4 on Hydrogen Embrittlement and held in Los Angeles, May 24-26, 1985. ; p. 309.

(Continued)

*Primary Examiner* — Anthony Stashick
*Assistant Examiner* — Kaushikkumar Desai
(74) *Attorney, Agent, or Firm* — David L. King

(57) ABSTRACT

A light weight pressure vessel (10) has been proposed. The vessel (10) is made of a steel, aluminum or non-metal liner (11) which is reinforced with high strength steel wires (21) of 2000-7000 MPa strength. The matrix is filled with a polymer epoxy resin (45). A top layer of fabric tape (33) soaked in resin (45) has been used to embed the finish end (24) of the wire (21) and to provide a protective layer over the wire reinforced area. The mesh or net fabric wrap tape (33) has periodic openings to allow penetration of polymer epoxy resin (45). A top coat of a UV resistant polyurethane paint (47) has been applied.

26 Claims, 2 Drawing Sheets

(51) Int. Cl.
*B65D 13/00* (2006.01)
*B21C 19/00* (2006.01)

(52) U.S. Cl.
CPC ... *F17C2203/066* (2013.01); *F17C 2203/0619* (2013.01); *F17C 2203/0636* (2013.01); *F17C 2203/0639* (2013.01); *F17C 2203/0646* (2013.01); *F17C 2203/0656* (2013.01); *F17C 2203/0658* (2013.01); *F17C 2203/0663* (2013.01); *F17C 2209/2154* (2013.01); *F17C 2221/011* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/036* (2013.01); *F17C 2260/011* (2013.01); *F17C 2260/012* (2013.01); *F17C 2260/042* (2013.01); *F17C 2260/053* (2013.01); *F17C 2270/0168* (2013.01); *F17C 2270/0186* (2013.01); *Y02E 60/321* (2013.01)

(56) References Cited

U.S. PATENT DOCUMENTS

| | | | |
|---|---|---|---|
| 2,829,671 A | 4/1958 | Ernst | |
| 3,184,092 A | 5/1965 | George | |
| 3,412,891 A | 11/1968 | Bastone | |
| 3,604,587 A | 9/1971 | Pechacek | |
| 3,631,382 A | 12/1971 | Paine et al. | |
| 3,905,398 A | 9/1975 | Johansen et al. | |
| 4,113,132 A | 9/1978 | Steiner | |
| 4,649,963 A * | 3/1987 | Raghavan et al. | 138/130 |
| 4,844,287 A | 7/1989 | Long | |
| 5,024,342 A | 6/1991 | Dallum | |
| 5,337,972 A | 8/1994 | Bhagwat et al. | |
| 5,425,830 A | 6/1995 | Bhagwat et al. | |
| 5,476,189 A | 12/1995 | Duvall | |
| 5,772,938 A * | 6/1998 | Sharp | 264/137 |
| 5,779,829 A | 7/1998 | Prakash et al. | |
| 5,816,426 A * | 10/1998 | Sharp | 220/62.19 |
| 5,822,838 A | 10/1998 | Seal et al. | |
| 6,058,713 A | 5/2000 | Bowen | |
| 6,109,306 A | 8/2000 | Kleinert | |
| 6,247,514 B1 | 6/2001 | Kim et al. | |
| 6,401,963 B1 | 6/2002 | Seal et al. | |
| 6,843,237 B2 | 1/2005 | Bowen | |
| 6,953,129 B2 | 10/2005 | Delay | |
| 6,960,318 B2 | 11/2005 | Yoneda et al. | |
| 7,082,978 B2 | 8/2006 | Sinopoli et al. | |
| 3,739,405 A1 | 4/2008 | Berman | |
| 7,412,956 B2 | 8/2008 | Gotou et al. | |
| 7,641,949 B2 | 1/2010 | Delay | |
| 8,038,029 B2 * | 10/2011 | Lindner et al. | 220/588 |
| 2003/0085117 A1 | 5/2003 | Keller et al. | |
| 2004/0040969 A1 | 3/2004 | DeLay et al. | |
| 2004/0129348 A1 * | 7/2004 | Ikeda et al. | 148/332 |
| 2004/0242096 A1 | 12/2004 | Prakash | |
| 2005/0051251 A1 | 3/2005 | Sinopoli et al. | |
| 2005/0260373 A1 | 11/2005 | DeLay et al. | |
| 2009/0095796 A1 | 4/2009 | Prakash | |

OTHER PUBLICATIONS

B. N. Popov, G. Zheng and Ralph E. White "Surface Treatment for Mitigation of Hydrogen Absorption and Penetration into AISI 4340 Steel", in The Proceedings of The International Technical Conference of AESF SUR/FIN, 1993, Anaheim, Jun. 21-24, p. 809-828.

G. Zheng, B. N. Popov and R. E. White "Surface Treatment for Mitigation of Hydrogen Penetration into AISI 4340 Steel and Inconel 718 Alloy," Journal of Applied Electrochemistry, 25, (1995), 212-218.

C. San Marchi, Technical Reference on Hydrogen Compatibility of Materials, Sandia National Laboratories, May 2006.

International Standard ISO 11439: Gas Cylinders.

* cited by examiner

33

STEEL WRAPPED PRESSURE VESSEL

RELATED APPLICATIONS

This application is a continuation in part of U.S. application Ser. No. 12/235,856 entitled "Wire Wrapped Pressure Vessels" filed on Sep. 23, 2008.

FIELD OF INVENTION

Steel wire or cord wrapped pressure vessels with a damage protective layer.

BACKGROUND OF THE INVENTION

A pressure vessel is a container to withstand a pressure differential between inside and outside. A pressure vessel may comprise of multiple layers of materials to provide various required properties. The inside and outside of the vessel may have special properties to meet the environment while the inner layers may be designed to provide strength, fatigue and fracture toughness to the vessel. The design is governed by standard pressure vessel equations published in books such as Harvey (see reference), and standards such as ASME Section VIII, Div. I, DOT FMVSS 304, ANSI-NGV-2, ISO11439 and several others. As an example, Dallum in U.S. Pat. No. 5,024,342 has shown a multilayer container to improve corrosion resistance.

In a thin wall cylindrical vessel the transverse stress is exactly double to that of the longitudinal stress. High strength wires therefore provide advantage in reinforcing a pressure vessel where the stresses are not uniform in each direction. In 1918, Goodall, U.S. Pat. No. 1,281,557 used steel wire of round or rectangular shapes to reinforce a rubber matrix hose. A textile fabric was used under and over the wires. Composite Overwrapped Pressure Vessels (COPV) using glass or carbon fibers have been in use for decades for very light weight applications. However, there has been a challenge in transferring the tensile strength of the reinforcing fibers to the vessel structure. Several reports show that on average 80% and 60% of the carbon filament strength is transferred to the pressure vessel at 35 MPa and 70 MPa design pressure tanks respectively. One of these reports is entitled, "Low Cost, High Efficiency, High Pressure Hydrogen Storage, DoE Review, Feb. 8, 2005, by Mark J. Warner, Quantum. It is believed that this significant reduction is related to the pre-tension, lay up arrangement and the sharp drop in off-axial properties of glass and carbon fibers which have zero plastic ductility.

Cord wrapped vessels have several advantages which include reduction of weight and cost. An individual filament has anisotropic properties. The strength, modulus, hardness etc. along longitudinal axis of the filament far exceeds that in the transverse direction. This makes the filament very strong along the longitudinal axis. Glass, carbon or steel filaments along the longitudinal axis typically have strength in the 3000 MPa to 6000 MPa range.

Composites made with longitudinal filaments, however, have lower mechanical properties along the transverse axis. As an example CYPLY® 1002 is a cured epoxy composite material based on a unique non-woven parallel filament construction in a polymer matrix. Tensile strengths at 0°, along 45° and 90° of fiber axis are 965, 24 and 20 MPa respectively. Even composites made of cross woven non ductile fibers such as fiberglass, e.g. FR-4 G-10 show significant anisotropy in mechanical properties.

When the cylinder winding filaments are steel wire or cords, the cut ends of wires have significant stiffness and do not conform to the curvature of the liner. This causes a problem which Steiner in U.S. Pat. No. 4,113,132 proposed welding the wire ends to the adjoining wires. This works in heavy gauge wires, however, is impractical in thin high carbon wires. Spun end pressure vessels are superior in pressure holding capacity precisely due to no use of welds in the cylinder body.

Once wrapped, the cylinder is still exposed to external damage and degradation. Most composite pressure vessels have a top layer of protective material to absorb damage from outside. Foam, other composites or similar materials have frequently been used. DeLay in U.S. Pat. No. 6,953,129 has discussed methods to apply a damage and/or fire tolerant outer layer. The layers comprise of jute and other strong fibers and microspheres containing a temperature responsive phase change material. DeLay in U.S. Pat. No. 7,641,949 suggests blending a high toughness fiber with the high strength fiber to gain surface toughness. Long in U.S. Pat. No. 4,844,287 has proposed using a liquid transmissive textile, and an outer polymeric containment layer. The liquid transmissive geotextiles may be woven, knit or non-woven fabrics or a needle punctured fabric. U.S. Pat. No. 5,476,189 titled Pressure vessel with damage mitigating system by Duvall, et al cites the use of a foam or crushable material near the outside of the vessel. Bastone in U.S. Pat. No. 3,412,891 suggests the use of a woven stabilizing scrim material to stabilize resin rich material on a vessel.

Light weight vessels are used for Self Contained (Underwater or regular) Breathing Apparatus, storage of gases on board an aircraft or other vehicles, or storage of gaseous fuels such as hydrogen or Compressed Natural Gas (CNG) on board a vehicle. Light weight vessels are made of very high strength metals such as aluminum, titanium or steel and may be circumferentially or fully wrapped with a reinforcing high strength cord of Aramid, fiberglass, carbon, steel etc. One version of the light weight vessels is called a composite over wrapped pressure vessels (COPV) which is usually wrapped with high strength glass or carbon fibers which are completely embedded in a polymer resin matrix.

The present invention teaches a novel solution to the problem of starting and finishing wire winding and maximizing the efficiency of the wire winding.

The present invention additionally cites a novel solution to the problem of adhering the cut wire ends without adversely affecting the structural integrity of the cylinder or materially increasing the weight of the finished cylinder.

SUMMARY OF THE INVENTION

To solve this problem, as described above, a non-metallic fabric tape or ribbon of 25 mm or greater width can be placed over the wire, followed by the rotation of the cylinder. After a few turns on the liner with both the tape and the wire feeding, the tape gets enough tracking on the liner and at that stage the wire underneath is cut and carefully placed between the layers of tapes. This gives a smooth finish to the wire winding. The tape can be of any width as long as it is compliant to the surface of the liner and the winding process. The tape is used further to wrap the full cord reinforcement area and it provides a good damage resistant protective coating to the cylinder.

With this background, a Type II helical wound cylindrical pressure vessel (10), per ANSI-NGV-2 was made by using a steel liner (11), high strength steel wire (21), epoxy (45), woven fiberglass mat (33) and a polyurethane UV protective paint (47). The O.D. of the steel liner (11) was nominal 339 mm. The average burst pressure of the steel liner alone was 325 Bar. Tire cord quality 0.35 mm diameter steel wire (22) of 3200 MPa strength having over 20% reduction in area at the tensile fracture was wound under tension on the liner with spacing between wires (23) at about 0-5% of wire diameter. The starting end of the wire was attached to the bare liner with the help of an adhesive tape. A polymer resin, epoxy was used as filler matrix (45) during the wire winding. A 55 mm wide fiberglass woven tape (33), commonly known as dry wall tape, with mesh opening of greater than 1 mm×1 mm was placed over the feeding wire (33a) on the cylinder a few turns prior to the finish cycle of the wire winding. Following a few rotations of the cylinder, the wire was cut and held (24) carefully until the fiberglass tape in the following rotation covered (33b) the cut end of the wire. The fiberglass tape then continued to wrap the full longitudinal length of the wire wound area covering the cylinder twice so a minimum of 2 layers of the woven tape results. This excludes any overlap at the ends of the wrapping if any exists. Preferably, the tape is wound end to end after which it is cut and placed on the rotating cylinder. Epoxy was applied to fill the mesh and to provide a top coat. Following the curing of the wound cylinder a thin coat of an UV resistant polymer (47) was applied on the top of the composite area.

DETAILED DESCRIPTION OF THE INVENTION

Recently a type of light weight pressure vessel was proposed by Prakash in US application 2009/0095796 where a high strength thin walled steel liner was circumferentially wrapped with 2000-6000 MPa tire cord quality steel wire. This application is incorporated herein by reference in its entirety. The steel wire or cord can be in the diameter range of 0.05 to 2.5 mm, preferably 0.10 to 2.0 mm. This vessel exhibited a great improvement in burst strength while maintaining a light weight structure comparable to carbon fiber wrapped pressure vessels, but at a much lower cost. Nevertheless, this Prakash cylinder had the same issues of adhering the cut ends of the steel wire to prevent damage to the structure. Prakash, like those inventors before him, had to insure the cut end did not get exposed during and after curing of the polymer.

This invention relates to a pressure vessel which is light in weight and is used for the storage of gas and is an improvement over the earlier Prakash pressure vessel. The inner liner which is also referred to as a cylinder or shell which forms a core or body structure and is made of metals or polymer and is wrapped, fully or partially with high strength cords. For the purpose of definition, a cord is also called a cable and is made of one or more filaments, also called fiber or wire. The spacing between wires has been kept to a minimum to minimize the total reinforcement thickness thereby improving the reinforcement efficiency. The tail end of the reinforcing cord has been properly imbedded between cloth or fiberglass tape. This tape, with a polymer resin, has been further extended to wrap the full cord reinforcement surface to provide a damage resistant layer. The over wrap fabric preferably, has periodic openings to facilitate proper penetrations and flow of a polymer which is used to fill all spaces between the cords and wraps. A polymer which can retard ultra violet (UV) rays is applied on the top to resist UV related damage to the composite underneath.

Figure 1:
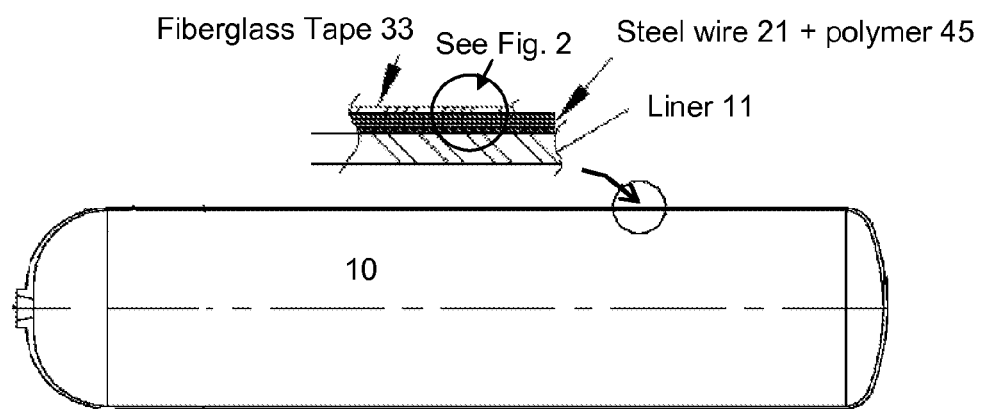
FIG. 1 shows a general drawing of a Type II pressure vessel 10 with a liner 11, steel wire 21, epoxy 45 composite overwrap, and a fabric wrap 33. See FIG. 2 for details of the wrap.
Figure 2:
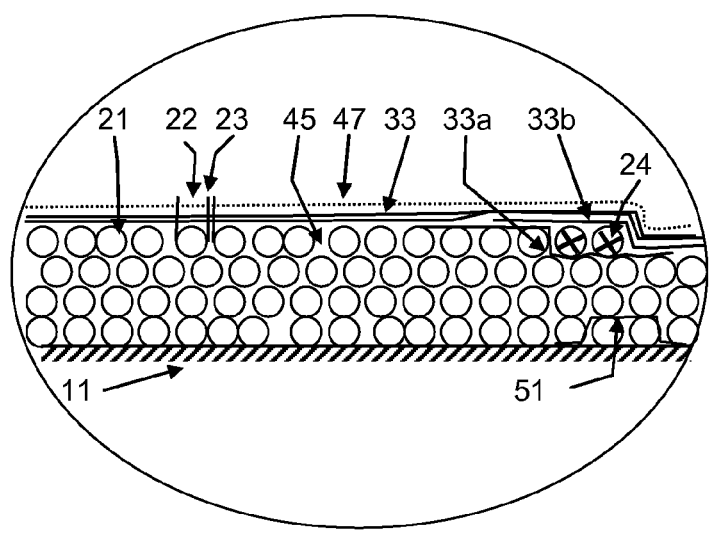
FIG. 2 shows a magnified view of a cross section of a wrapped cylinder. The liner 11 is wound with cords 21 of diameter 22. The inter cord spacing is 23. Fabric over wrap 33 has the cut end of the cord 24 between 33a, the bottom layer and 33b, the top layer. The full matrix is filled with a polymer 45 and top coated with a UV resistant polymer 47. An adhesive tape 51 was used to anchor the starting group of wires.

With reference to FIG. 1, the pressure vessel 10 has a light weight liner 11. The steel liner 11, as illustrated, is made as one piece, having spun or otherwise integrally formed ends, and is free of welds that could have been used to affix ends to the cylinder's body. The one end has a fitting boss to which a valve (not illustrated) can be added. The cylinder 11 is a CNG or NGV2-2A type.

The body of the cylinder can be wrapped with steel wires or cords as is taught in the Prakash patent publication 2009/0095796 which has been incorporated herein by reference in its entirety.

The wires (21) are preferably made of steel having a strength of 2000-6000 MPa having good plastic ductility. The inventors expect that the presence of plastic ductility in steel wire will significantly improve the off axis properties and thus contribute to a better translation of strength to the pressure vessel (10).

Steel and most other metals may additionally require protection against penetration of hydrogen which may reduce its ductility. Atomic hydrogen is known to penetrate into steel at elevated temperature and pressure. Literature indicates that face centered cubic nickel or copper significantly retard penetration of hydrogen to steel. It is therefore proposed that the steel core (11) and steel wires (21) may be plated with copper, nickel, brass or zinc to improve protection against hydrogen and simple corrosion. Multiple thin coatings (22) of one or more of the above referenced metals may be applied. Additionally a polymer coating may also be applied to improve environmental resistance of the metal. A diffusion heat treatment will make the metal plating and core metal bond stronger. It is proposed that such metal plating be applied to polymer core tanks also to retard leakage of hydrogen from the core (11). Retarding leakage may help improve the life of the wrap material such as steel besides conserving the stored fluid.

With this background, a Type II helical wound cylindrical pressure vessel (10), per ANSI-NGV-2 was made by using a steel liner (11), high strength steel wire (21), epoxy, woven fiberglass mat (33) and a polyurethane UV protective paint (47). The O.D. of the steel liner (11) was nominal 339 mm. The average liner burst pressure was 325 Bar. Tire cord quality 0.35 mm steel wire (21) of 3200 MPa strength having over 25% reduction in area at the tensile fracture was wound on the liner (11) with spacing (23) between wires (21) at about 0-5% of wire diameter. The starting end of the wire (21) was attached to the bare liner (11) with the help of an adhesive tape (51) placed inward of the outermost coil. During the wrap process the wire (21) was maintained under a pre-determined tension. A polymer resin, epoxy (45) was used as filler matrix during the wire winding. A 55 mm wide fiberglass woven tape (33), commonly known as dry wall tape, with mesh opening of greater than 1 mm×1 mm was placed over the feeding wire (21) adjacent the woven tape shown as (33a) on the cylinder (11) a few turns prior to the finish cycle of the wire winding. Following a few rotations of the cylinder (11) the wire (21) was cut and held carefully at its ends (24) until the fiberglass tape (33) in following rotation covered the woven tape shown as (33b) and the cut end (24) of the wire (21). The fiberglass tape (33) then continued to wrap the full longitudinal length of the wire (21) wound area covering the cylinder (11) twice so a minimum of 2 layers of the woven tape (33) results excluding any edge overlap if any exists. Preferably, the tape (33) is wound edge to edge after which it is cut and placed on the rotating wire wrapped cylinder (11). Epoxy (45) was applied to fill the mesh openings of the woven tape (33) and to provide a top coat. Following curing of the epoxy (45), a top coat of UV resistant polyurethane paint (47) was applied to protect against UV rays. Burst pressures of the vessels (10) were 565 and 658 Bars with 4 and 6 layers of winding of the wires (21) embedded in the cured epoxy (45) respectively. This shows that the strength of wire (21) was utilized by the cylinder (11) of the pressure vessel (10) at 90 to 100% level. This increase in efficiency is attributed to the high winding density, and the ductility of the wire (21). Higher lateral winding density helps reduce the number of layers, thus the overall thickness of the vessel (10). The thinner wall vessel (10) is more strength efficient. It is therefore recommended that the spacing (23) between wires (21) should be minimum and not more than 25% of the diameter of the cord or wire (21). It is important to fill the spaces (23) between wires (21) and liner (11) with a good polymer (45) which has low moisture absorption, good adhesion to all reinforcing surfaces and appropriate elastic elongation to accommodate the expansion of the cylinder (11) at all load levels as the wrapped layers of high strength reinforcing monofilament wire covering the main body expand and contract with the expansion and contraction of the liner or shell without uncoiling, similar to a coiled spring being stretched diametrically between fixed ends by way of a clarifying example. The winding process described above did not require any fastener or welding as proposed by Steiner U.S. Pat. No. 4,113,132.

Figure 3:
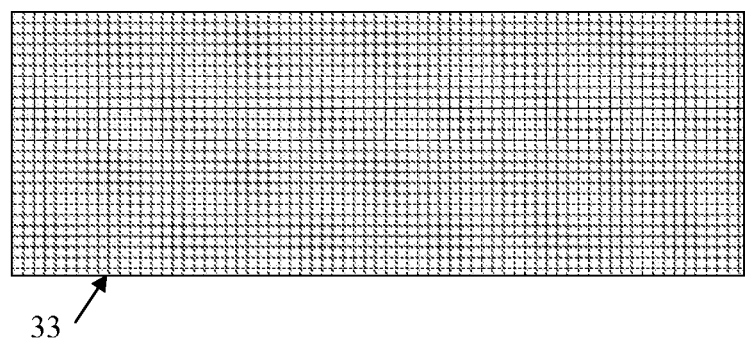
FIG. 3 is a plan view of the woven or porous tape 33.

In the proposed invention, the protective tape layer (33) can be the same tape (33) which was used to embed the cut end (24) of the winding wires (21) as described in earlier paragraphs, as shown in FIG. 3. It is important for this tape (33) to be fully soaked by the epoxy resin (45). We propose the use of a fabric tape (33) with a mesh with reasonable opening to achieve this goal. A fiberglass mesh tape (33), also called dry wall tape of 55 mm width and mesh opening of approximately 2 mm×2 mm was used to wrap the cylinder (11) described in earlier paragraph. Net or veil fabric made of synthetic materials such as polyester has also been used with success. It is recommended that the wrapped fabric have periodic openings of any shape to accommodate from 0.5 mm to 35 mm diameter hole. The minimum width of the tape (33) is 15 mm and the thickness of the tape (33) is 0.5 mm to 5 mm.

The filler epoxy or other resin (45) may contain additional fillers such as micro glass spheres, glass fibers, jute or cotton or other micro fibers. Though not used in the current development, addition of these components will increase the surface toughness of the vessel.

The NGV-2 standard requires that the cylinder or pressure vessel (10) be reasonably resistant to UV rays. A UV protective polyurethane paint (47) was applied on the top of the outermost epoxy (45) laden tape (33) layer for that purpose.

The Type II cylinder made according to the procedure discussed above formed a pressure vessel (10) that was low in weight and passed the ANSI-NGV-2 requirements for on board vehicle storage of compressed natural gas (CNG) at 248 Bar pressure. The weight was approximately 0.83 Kg per liter water volume of the cylinder. Though the liner (11) used in the above experiment was seamless and made by using the Direct Drawing and Ironing (DDI) process and was heat treated to 1020 MPa strength, other types of liners can easily be used. In U.S. Pat. No. 6,843,237 Bowen has suggested the use of a cylinder made of welded components. ASME Div VIII codes allow welding of pressure vessels. Economical grades of steel in the 500 to 1400 MPa range can be used to make the liner. Aluminum alloy and polymer liners are commonly used in making COPV and can be used to make a cylinder of the type proposed in this document.

A pressure vessel (10), is comprised of at least an inner liner or shell (11) for leak proof containment of gas. The inner liner is wrapped with layers of high strength wire or cords (21), where one of the wire or cord's is a steel wire (21) of strength 2000 MPa to 7000 MPa and where the average lateral space (23) between the cords (21) is 0 to 25% of the cord (21) diameter. A polymer epoxy resin (45) is applied to fully fill the inter cord cavities and adhere to the wire or cord (21) surfaces. A fabric tape (33) soaked with a polymer epoxy resin (45) is wrapped on the top of the reinforcing wires or cords (21) to provide a protective layer of 0.5 to 5 mm thickness.

In a preferred embodiment, the pressure vessel (10) has at least an inner liner or shell (11) for leak proof containment of gas which is wrapped with layers of high strength reinforcing wire or cords (21). One of the wire or cord's is a steel wire (21) of strength 2000 MPa to 7000 MPa. The average lateral space (23) between the cords (21) is 0 to 25% of the cord (21) diameter. A polymer epoxy resin (45) is applied to fully fill any inter cord cavities and adhere to wire or cord (21) surfaces. A fabric tape (33) soaked with a polymer epoxy resin (45) is wrapped on the top of the reinforcing wires or cords (21) to provide a protective layer of 0.5 to 5 mm thickness. The strength of the steel wire (21) can be 3000 to 5000 MPa and has a reduction in area at tensile fracture of more than 20% and where the average lateral space (23) between wires (21) is less than 5% of the wire (21) diameter. The inner shell (11) is a cylindrical vessel made of steel of strength 950-1400 MPa and a tensile ductility of over 10% and has no longitudinal seam. Although not preferred for Type II cylinders, the inner shell (11) can be made of steel by welding multiple components together. The inner shell (11) can be made of aluminum alloy. The cylinder (11) is fully wrapped by the steel wire cord (21) to provide both, longitudinal and transverse reinforcement to the vessel (10). The non-metallic fabric tape (33) preferably is a fiberglass or polymer tape which has multiple openings of 0.1 mm or larger to allow easy penetration of the polymer resin (45). The over wrap fabric tape (33) is a fiberglass mesh tape of 20 mm to 100 mm width with multiple openings of 1 mm to 5 mm and thickness of 0.2 to 0.8 mm. The finish end (24) of the cord (21) is placed securely between layers of the over wrap fabric (33) and the full structure is filled with a polymer (45). The finish end (24) of the wrapping wire (21) is placed over a fiberglass or other fabric tape (33) of 20 mm to 50 mm width having periodic openings of over 0.5 mm and is covered by the same fabric tape (33) and a filler polymer (45). The vessel (10) can additionally have a top layer of a UV protective polyurethane paint (47) which is resistant to ultra violet rays.

This pressure vessel (10) can be formed as an assembly using the method of manufacturing a light weight pressure vessel (10) having a leak proof container or liner (11) with one or more nozzle openings by performing the steps of attaching ends of at least one or a group of spaced wires (21) of a diameter of 0.5 mm or less to the liner inward of the outermost coil; winding under tension the wire or group of wires (21) while maintaining a spacing (23) of 25% or less of the wire diameter about the liner (11) by rotating the liner (11); applying a filler epoxy resin polymer (45) while winding the wire or spaced group of wires (21) to fill any voids or spaces; forming layers of wire (21) about the liner (11) to a desired number of layers; attaching a woven mesh tape (33) to the wire or spaced wires (21) and continue winding one or more turns; cutting only the wires (21) but not the tape (33) to form cut wire ends (24) at a finish turn; wrapping the cut ends (24) affixed to the tape (33) onto the underlying wound wires (21) on the liner (11) and continue wrapping the woven tape (33) about the assembly; covering the entire wrapped length of the liner (11) with one or more layers of tape (33); applying the resin epoxy polymer (45) to the woven tape (33); cutting the tape (33); and curing the assembly. After assembly, a coating of UV protective polyurethane paint (47) can be applied. At the start of this assembly, the cut ends of the wire or spaced wires (21) can be taped (51) or otherwise affixed to the liner (11) to facilitate starting the winding. This tape (51) can be masking tape, double sided tape or any other suitable adhesive coated tape. The step of applying the epoxy resin (45) can be accomplished by coating the wires (21) as they are being wound or first coating the liner (11) and then the wound wires (21) already wrapped or any combination of these as long as all the spaces and voids are filled.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

We claim:

1. A light weight Type II helical wound cylindrical metal pressure vessel comprised of at least a thin walled steel seamless inner liner or shell formed as one-piece having spun or integrally formed ends free of welds, the inner shell being a cylindrical vessel made of steel of strength 950-1400 MPa and a tensile ductility of over 10% and has no longitudinal seam, for leak proof containment of gas which is wrapped with layers of high strength reinforcing monofilament wire covering at least the main body of the inner liner or shell, the monofilament wire being of a diameter between 0.10 and 2.0 mm, where the steel monofilament wire has a strength 2000 MPa to 7000 MPa and where the average lateral space between the monofilament wire is 0 to 25% of the wire diameter and where a polymer is applied to fully fill inter monofilament wire cavities and adhere to surfaces of the monofilament wire and where a non-metallic fabric soaked with the polymer is wrapped on the top of the one or more high strength reinforcing monofilament wires to provide a protective layer of 0.5 to 5 mm thickness, and wherein the one or more reinforcing monofilament wires have a cut end or ends taped or otherwise affixed to the liner at a start of the wrap inward of an outermost coil and a cut end or ends at a finish layer underlying the non-metallic fabric, the monofilament wires being wrapped in the absence of welding and wherein the vessel is wrapped having 4 layers of the monofilament wire embedded in the polymer with the strength efficiency of the monofilament wire utilized at burst pressures of the vessel in the range of 90 to 100 percent of the wire strength due to a high winding density and wire ductility reducing the number of layers and overall thickness of the wrapped vessel to accommodate the expansion of the liner at all load levels up to burst pressure thereby reducing stress in the thin walled inner liner under expansion at all load levels wherein the wrapped layers of high strength reinforcing monofilament wire covering the main body expand and contract with the expansion and contraction of the liner or shell of the pressure vessel without uncoiling.

2. The vessel of claim 1, wherein the strength of the steel monofilament wire is 3000 to 5000 MPa and has a reduction in area at tensile fracture of more than 20% and where the average lateral space between wires is less than 5% of the wire diameter.

3. The vessel of claim 1, where the inner shell is made of aluminum alloy.

4. The vessel of claim 1 where the vessel is fully wrapped by the reinforcing monofilament wire to provide both, longitudinal and transverse reinforcement.

5. The vessel of claim 1 wherein the non metallic fabric is comprised of a fiberglass or polymer tape which has multiple openings of 0.1 mm or larger to allow easy penetration of the polymer.

6. The vessel of claim 1 where the over wrap fabric is a fiberglass mesh tape of 20 mm to 100 mm width with multiple openings of 1 mm to 5 mm and thickness of 0.2 to 1.0 mm.

7. The vessel of claim 1 where the finish end of the monofilament wire is placed securely between layers of the over wrap fabric and the full structure is filled with the polymer.

8. The vessel of claim 1 where the finish end of the wrapping monofilament wire is placed over a fiberglass or other fabric tape of 20 mm to 50 mm width having periodic openings of over 0.5 mm and is covered by the same fiberglass or other fabric tape and the polymer.

9. The vessel of claim 1 which has a top layer of a second polymer which is resistant to ultra violet rays.

10. A light weight Type II helical wound cylindrical metal pressure vessel comprised of at least a thin walled steel seamless inner liner or shell formed as one-piece having spun or integrally formed ends free of welds, the inner shell being a cylindrical vessel made of steel of strength 950-1400 MPa and a tensile ductility of over 10% and has no longitudinal seam, for leak proof containment of gas which is wrapped with layers of high strength reinforcing wire of a diameter of 0.35 mm, where the wire is monofilament steel wire having a strength 3000 MPa to 5000 MPa and where the average lateral space between the reinforcing wire is 0 to 5% of the wire diameter and where a polymer is applied to fully fill the inter wire cavities and adhere to wire surfaces and where a non-metallic fabric soaked with the polymer is wrapped on the top of the reinforcing monofilament steel wire to provide a protective layer of 0.5 to 5 mm thickness, and wherein the reinforcing monofilament steel wire has a cut end or ends taped or otherwise affixed to the liner at a start of the wrap inward of an outermost coil and a cut end or ends at a finish layer underlying the non-metallic fabric, the monofilament steel wire being wrapped in the absence of welding, and wherein the vessel is wrapped having 4 to 6 layers of wire embedded in the polymer with the strength efficiency of the monofilament wire utilized at burst pressures of the vessel in the range of 90 to 100 percent of the wire strength due to a high winding density and wire ductility reducing the number of layers and overall thickness of the wrapped vessel to accommodate the expansion of the liner at all load levels up to burst pressure thereby reducing stress in the thin walled inner liner under expansion at all load levels, wherein the steel wire has a reduction in area at tensile fracture of more than 20% wherein the wrapped layers of high strength reinforcing monofilament wire covering the main body expand and contract with the expansion and contraction of the liner or shell of the pressure vessel without uncoiling.

11. The vessel of claim 10, where the inner shell is made of aluminum alloy.

12. The vessel of claim 10 where the vessel is fully wrapped by the reinforcing monofilament steel wire to provide both, longitudinal and transverse reinforcement.

13. The vessel of claim 10 wherein the non-metallic fabric is comprised of a fiberglass or polymer tape which has multiple openings of 0.1 mm or larger to allow easy penetration of the polymer.

14. The vessel of claim 10 where the over wrap fabric is a fiberglass mesh tape of 20 mm to 100 mm width with multiple openings of 1 mm to 5 mm and thickness of 0.2 to 1.0 mm.

15. The vessel of claim 10 where the finish end of the monofilament wire is placed securely between layers of the over wrap fabric and the full structure is filled with the polymer.

16. The vessel of claim 10 where the finish end of the wrapping wire is placed over a fiberglass or other fabric tape of 20 mm to 50 mm width having periodic openings of over 0.5 mm and is covered by the same fiberglass or other fabric tape and the polymer.

17. The vessel of claim 10 which has a top layer of a second polymer which is resistant to ultra violet rays.

18. A light weight Type II helical wound cylindrical metal pressure vessel comprised of at least a thin walled steel seamless inner liner or shell formed as one-piece having spun or integrally formed ends free of welds, the inner shell being a cylindrical vessel made of steel of strength 950-1400 MPa and a tensile ductility of over 10% and has no longitudinal seam, for leak proof containment of gas which is wrapped with layers of one or more high strength reinforcing wires or in a multi-layered wrap-around covering at least the main body of the inner liner or shell, the steel wires being in one strand, each strand being a monofilament wire of a diameter of 0.35 mm, where the strands are steel wire of strength 2000 MPa to 7000 MPa and where the average lateral space between the reinforcing strands is 0 to 25% of the monofilament wire diameter and where a polymer is applied to fully fill inter wire cavities and adhere to wire surfaces and where a non-metallic fabric soaked with the polymer is wrapped on the top of the one or more reinforcing strands to provide a protective layer of 0.5 to 5 mm thickness, and wherein the one or more reinforcing strands have a cut end or ends taped or otherwise affixed to the liner at a start of the wrap inward of an outermost coil and a cut end or ends at a finish layer underlying the non-metallic fabric, the one or more strands being wrapped in the absence of welding and wherein the vessel is wrapped having 4 layers of the monofilament wire embedded in the polymer has the strength efficiency of the strands utilized at burst pressures of the vessel in the range of 90 to 100 percent of the wire strength due to a high winding density and wire ductility and the multi-layered wrap-around layers of wire covering the main body expand and contract with the expansion and contraction of the liner or shell of the pressure vessel without uncoiling.

19. The vessel of claim 18 wherein the strength of the steel monofilament wire is 3000 to 5000 MPa and has a reduction in area at tensile fracture of more than 20% and where the average lateral space between the monofilament wires is less than 5% of the wire diameter.

20. The vessel of claim 18 where the inner shell is made of aluminum alloy.

21. The vessel of claim 18 where the vessel is fully wrapped by the reinforcing monofilament wires to provide both, longitudinal and transverse reinforcement.

22. The vessel of claim 18 wherein the non metallic fabric is comprised of a fiberglass or polymer tape which has multiple openings of 0.1 mm or larger to allow easy penetration of the polymer.

23. The vessel of claim 18 where the over wrap fabric is a fiberglass mesh tape of 20 mm to 100 mm width with multiple openings of 1 mm to 5 mm and thickness of 0.2 to 1.0 mm.

24. The vessel of claim 18 where the finish end of the monofilament wire is placed securely between layers of the over wrap fabric and the full structure is filled with the polymer.

25. The vessel of claim 18 where the finish end of the wrapping wire is placed over a fiberglass or other fabric tape of 20 mm to 50 mm width having periodic openings of over 0.5 mm and is covered by the same fiberglass or other fabric tape and the polymer.

26. The vessel of claim 18 which has a top layer of a second polymer which is resistant to ultra violet rays.

\* \* \* \* \*